US008914369B2

(12) United States Patent
Cohen

(10) Patent No.: US 8,914,369 B2
(45) Date of Patent: Dec. 16, 2014

(54) METHOD AND A SYSTEM FOR DATA VERIFICATION AND/OR AUTHENTICATION

(75) Inventor: Roy Cohen, Haifa (IL)

(73) Assignee: Privacy Inside Ltd., Tel-Aviv (IL)

( * ) Notice: Subject to any disclaimer, the term of this patent is extended or adjusted under 35 U.S.C. 154(b) by 119 days.

(21) Appl. No.: 12/989,958

(22) PCT Filed: Apr. 21, 2009

(86) PCT No.: PCT/IL2009/000435
§ 371 (c)(1),
(2), (4) Date: Oct. 28, 2010

(87) PCT Pub. No.: WO2009/133547
PCT Pub. Date: Nov. 5, 2009

(65) Prior Publication Data
US 2011/0047158 A1 Feb. 24, 2011

(30) Foreign Application Priority Data

Apr. 30, 2008 (IL) .......................... 191169

(51) Int. Cl.
*G06F 7/00* (2006.01)
*G06F 17/30* (2006.01)
*G06F 21/62* (2013.01)
*G06F 7/76* (2006.01)
*G06F 7/22* (2006.01)
*G06F 21/60* (2013.01)
*G06F 9/46* (2006.01)

(52) U.S. Cl.
CPC .............. *G06F 21/6209* (2013.01); *G06F 9/46* (2013.01); *G06F 7/76* (2013.01); *G06F 7/22* (2013.01); *G06F 21/606* (2013.01); *G06F 2221/2107* (2013.01)
USPC ............ 707/737; 707/756; 707/757; 380/268

(58) Field of Classification Search
None
See application file for complete search history.

(56) References Cited

U.S. PATENT DOCUMENTS

| 6,957,349 | B1 * | 10/2005 | Yasukura | 726/26 |
| 7,231,528 | B1 * | 6/2007 | Yasukura | 713/193 |
| 2004/0032953 | A1 * | 2/2004 | Silverbrook et al. | 380/54 |
| 2005/0246385 | A1 * | 11/2005 | Nishino et al. | 707/200 |
| 2006/0008256 | A1 * | 1/2006 | Khedouri et al. | 386/124 |
| 2006/0045270 | A1 * | 3/2006 | Cohen | 380/268 |
| 2006/0277098 | A1 * | 12/2006 | Chung et al. | 705/14 |

(Continued)

FOREIGN PATENT DOCUMENTS

| EP | 1193666 | 4/2002 |
| EP | 1327937 | 7/2003 |
| WO | WO 2009/133547 | 11/2009 |

OTHER PUBLICATIONS

International Search Report and the Written Opinion Dated Aug. 6, 2009 From the International Searching Authority Re.: Application No. PCT/IL2009/000435.

(Continued)

*Primary Examiner* — Dung K Chau

(57) ABSTRACT

A method for rearranging a data segment. The method comprises providing a data segment containing digital content, generating a set of human dependent variables according to a plurality of human related activities, rearranging the data segment according to the set of human dependent variables, and updating a log according to the rearranging. The digital content may be retrieved from the rearranged data segment according to the log.

38 Claims, 9 Drawing Sheets

(56) References Cited

U.S. PATENT DOCUMENTS

| | | | |
|---|---|---|---|
| 2007/0143592 A1* | 6/2007 | Kitani | 713/150 |
| 2009/0150676 A1* | 6/2009 | Chen et al. | 713/176 |
| 2009/0182753 A1* | 7/2009 | Chang et al. | 707/100 |

OTHER PUBLICATIONS

Eastlake et al. "Randomness Requirements for Security (RFC 4086)", IETF Standard, Internet Engineering Task Force, XP015041913, 48 P., Jun. 1, 2005.

Office Action Dated Oct. 30, 2011 From the Israel Patent Office Re. Application No. 191169 and Its Translation Into English.

International Preliminary Report on Patentability Dated Nov. 11, 2010 From the International Bureau of WIPO Re. Application No. PCT/IL2009/000435.

Office Action Dated Apr. 3, 2013 From the Israel Patent Office Re. Application No. 191169 and Its Translation Into English.

Veritas "File System White Paper", Veritas Software Corporation, 19 P., 1996.

\* cited by examiner

METHOD AND A SYSTEM FOR DATA VERIFICATION AND/OR AUTHENTICATION

RELATED APPLICATIONS

This Application is a National Phase of PCT Patent Application No. PCT/IL2009/000435 having International filing date of Apr. 21, 2009, which claims the benefit of Israel Patent Application No. 191169 filed on Apr. 30, 2008. The contents of the above Applications are all incorporated herein by reference.

FIELD AND BACKGROUND OF THE INVENTION

The present invention, in some embodiments thereof, relates to a method and a system for verifying the data authenticity and, more particularly, but not exclusively, to a method and a system for verifying the authenticity of data transfer, process, and storage.

SUMMARY OF THE INVENTION

According to an aspect of some embodiments of the present invention there is provided a method for rearranging a data segment. The method comprises providing a data segment containing digital content, generating a set of human dependent variables according to a plurality of human related activities, rearranging the data segment according to the set of human dependent variables, and updating a log according to the rearranging. The digital content is retrieved from the rearranged data segment according to the log.

Optionally, the method further comprises adding unrelated content to the data segment before the rearranging.

Optionally, generating is performed by a computing unit, the generating comprising recording the plurality of human related activates from a routine operation of the computing unit by a human user.

More optionally, the routine operation is an input recorded from a group consisting of manipulating of a mouse pointer and typing a sequence of letters.

More optionally, the recording comprises recording an audio print of the voice of the user, the human characteristics comprises features extracted from the audio print.

More optionally, the recording comprises recording a fingerprint of the voice of the user, the human characteristics comprises features extracted from the fingerprint.

More optionally, the recording comprises analyzing information related to a profile of the user, the human characteristics comprises features extracted from the analysis.

More optionally, the generating is performed by a computing unit, the recording comprises capturing at least one biometric characteristic related to a user operating the computing unit.

More optionally, the at least one biometric characteristic comprises features extracted from an image of the user.

Optionally, the method further comprises compressing the data segment before the rearranging.

Optionally, rearranging comprises dividing the data segment to a plurality of arrays and rearranging the plurality of arrays according to the human dependent variables.

More optionally, the plurality of arrays comprises at least one of a subgroup of arrays each having a different size and a subgroup of arrays each having a different number of dimensions.

More optionally, the dividing is performed according to the human dependent variables.

More optionally, digital content stored in at least one of the plurality of arrays is rearranged according to the human dependent variables.

More optionally, the rearranging comprises further rearranging the divided rearranged data segment according to the human dependent variables.

More optionally, the rearranging comprises dividing the set of human dependent variables to a plurality of subsets and using each the subset for rearranging at least one of the plurality of arrays.

Optionally, the method is executed using a computing unit, the rearranging comprising halting a plurality of processes executed on the computing unit during the rearranging.

Optionally, the method further comprises dividing the data segment to a plurality of data sub-segments and spreading the plurality of data sub-segments among a plurality of computing units; wherein the digital content is retrieved after the plurality of data sub-segments are gathered.

Optionally, the method further comprises dividing the log to a plurality of subsets and spreading the plurality of subsets among a plurality of computing units; wherein the digital content is retrieved after the plurality of subsets is gathered to reconstruct the log.

Optionally, the digital content comprises identification information related to an article, further comprising using the rearranged data log for tagging for the article.

More optionally, the tagging allows the authentication of the article.

Optionally, the data segment is hosted in a memory device, the method being performed in response to a deletion of information stored in the data segment.

According to an aspect of some embodiments of the present invention there is provided a method for forwarding a data segment. The method comprises providing a data segment containing digital content at a source computing unit, generating a set of human dependent variables according to a plurality of human related activities, rearranging the data segment according to the set of human dependent variables, logging the rearranging in a rearranging log, and forwarding the rearranged data segment and the rearranging log to a target computing unit.

Optionally, the target computing unit may retrieve the digital content from the rearranged data segment by using the set of human dependent variables according to the rearranging log.

Optionally, the method further comprises verifying the target computing unit before the forwarding.

More optionally, the verifying is based on at least one of the internet protocol (IP) address, the media access control (MAC), and the hardware identification of the target computing unit.

Optionally, the forwarding comprises halting a communication of at least one of the source and target computing unit.

Optionally, the forwarding comprises separately forwarding the rearranged data segment to the rearranging log target computing unit.

Optionally, the forwarding is performed over a peer-to-peer (P2P) connection.

Optionally, the generating further comprises generating a first segment of the human dependent variables in the source computing unit, generating a second segment of the human dependent variables in the target computing unit, and combining the first and second segments for generating the set of human dependent variables.

Optionally, the method further comprises forwarding the first segment to the target computing unit, allowing the target computing unit to use the first segment for rearranging the second segment and forwarding the rearranged second segment to the source network, and allowing the source computing unit to use the first segment for retrieving the second segment from the rearranged second segment. The combining is separately performed in each the computing unit.

According to an aspect of some embodiments of the present invention there is provided a system for rearranging a data segment. The system comprises an input module configured for receiving a data segment containing digital content, a capturing module configured for recording a plurality of human related activities and generating a set of human dependent variables accordingly, a rearranging module configured for rearranging the data segment according to the set of human dependent variables, and a logging module configured for logging the rearranging. The logging allows the retrieving of the digital content from the rearranged data segment.

According to an aspect of some embodiments of the present invention there is provided a method for generating a unique identification tag to an article. The method comprises providing an identification segment containing identification information, generating a set of random variables according to a plurality of human related activities, rearranging the identification segment according to the set of random variables, and tagging an article with the rearranged identification segment. The identification segment is retrieved using a log of the rearranging.

Optionally, the random variables are human dependent variables generated according to a plurality of human related activities.

Optionally, the tagging comprises associating the article with a tag comprising the rearranged identification segment, the tag being selected from a group consisting of: a barcode, a radio frequency identification (RFID) tag, a machine-readable visual representation, and a machine-readable audio representation.

Optionally, the method further comprises allowing an authentication of the article by the retrieved identification segment.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
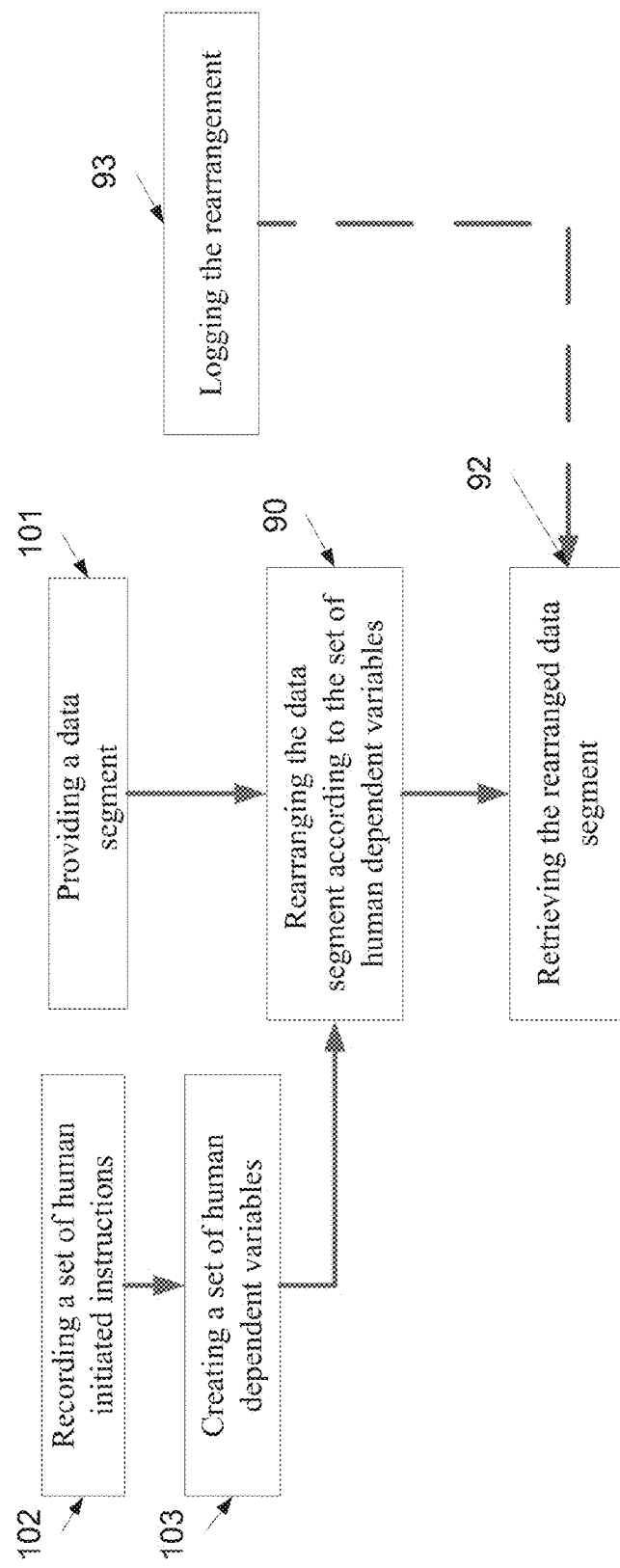
FIG. 1 is a flowchart of a method for rearranging digital content of a data segment according to human related activities, according to some embodiments of the present invention.

The present invention, in some embodiments thereof, relates to a method and a system for verifying the data authenticity and, more particularly, but not exclusively, to a method and a system for verifying the authenticity of data transfer.

Some embodiments of the present invention are related to a method for verifying the authenticity of data that is transferred between at least two peers, such as computing unit computing unit.

The method is based on a set of human dependent variables which is generated according to human related activities which are optionally recorded during a routine operation of the computing unit, for example during the manipulation of a mouse pointer, from movements of the user and/or features, which are captured optionally using an image sensor, and from sounds which are produced by the user. First, a segment of digital content is provided at a computing unit. Then, the segment is rearranged according to the set of human dependent variables. This rearranging is logged, optionally by the computing unit. The logging allows the retrieving of the digital content from the rearranged data segment. The digital content may include any digital content, such as digital records, media files, and/or any other content with a meaning that may be read using digital measures.

Optionally, the log and the rearranged data segment are forwarded, optionally separately, to one or more computing unit, which may be referred to herein as target computing unit. The forwarding may be performed via a network, such as a communication network, or by any other forwarding means, such as a transmitter or any other data carrier computing unitcomputing unit Optionally, the computing unitcomputing unit are computers, such as personal computers, Smartphones, or any local and/or remote CPU based devices which are connected via a computer network, such as the Internet, to other computing unit or not connected to any other computing unit. The one or more target computing unitcomputing unit now use the log for reconstructing the manipulated data segment. For example, the digital content of the data segment is reconstructed by backtracking along the log, optionally using a copy of the set of human dependent variables which have been used for the rearrangement. As the data has been manipulated according to the aforementioned set of human dependent variables, the possibility that it may be reconstructed using another set of variables is low. In such a manner, reconstructing digital content with known characteristics indicates the authenticity of the connection that has been used for forwarding the data segment from the source computing unit or the storage to the target network or the storage computing unit is high.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart of a method for rearranging digital content of a data segment according to human related activities, according to some embodiments of the present invention. The method, which is described in FIG. 1, allows the rearranging of a segment of data that includes digital content, such as a file, a media file, a number of files, a record, a set of records, and/or any other digital content that may be processed by a computing unit, such as a personal computer, a server and/or a Smartphone. The rearranged data segment may be used as a container that stores the digital content in a manner that is not readable by applications such as operating system applications. Such a representation of the digital content reduces the probability that such a digital content may be changed and/or manipulated by an application and/or an operating system application that is desegregated to process a certain type of digital content.

The method may be implemented by any computing unit, which may be referred to herein as a source computing unit or a storage computing unit. As used herein, a computing unit or a computing unit means a personal computer, a server, a cellular phone, a laptop, a personal digital assistant (PDA) and/or any other computing unit. It should be noted that as the data is digital and does not have to be represented as a physical object, it is not limited to three dimensions. The data segment may have any number of dimensions, for example 1, 2, 3, 4, 5, 10, 100, and N dimensions. As used herein, any number of dimensions may be referred to herein as N-dimensions.

As shown at 102, a set of human related activities is provided and used for creating a set of human dependent variables, as shown at 103. Optionally, the set of human dependent variables are recorded and stored on the source computing unit and/or on a computing unit that is accessible thereto. The human dependent variables may be a set of vectors, trajectories, values, links, references, and/or pointers which are selected according to the aforementioned human related activities. Optionally, the human related activities are recorded from routine actions which are performed by a user. Optionally, the human related activities are recorded from an input device or user interface (UI) that is used for entering data, such as a keyboard, a virtual input device, such as a graphical user interface (GUI) or a virtual keyboard and/or a mouse. For example, the motion of a mouse pointer on the screen of the source target computing unit may be recorded and/or the keyboard typing of a user. Optionally, the human related activities are recorded from an image capture device, such as a webcam or any other image and/or an input device sensor that is connected to the source computing unit computing unit and can record human actions. Optionally, the human related activities are recorded from an audio capture device, such as a microphone, or any other capturing device, such as a camera, a finger print reader, a mouse, a pointing device and an eye reader as further described below. Optionally, the set of human dependent variables is determined and/or adjusted according to features of the user which are captured by the image capture device and/or from features of a face that is depicted in an uploaded image, such as an image of the user.

Optionally, the set of human dependent variables is generated according to biometric characteristics of a user that uses the rearranging computing unit. For example, the fingerprint of the user may be recorded and the unique pattern thereof may be used for generating the human dependent variables. In another example, an image of the face and/or the reticulum of the user are used for generating the human dependent variables. Optionally, the biometric characteristics are acquired from an audio print that is based on a random recording and/or a designated recording of the voice of the user and/or on the background noise that is recorded in a random, pseudorandom, substantially sequential and/or sequential manner. Optionally, the set of human dependent variables is generated according to personal characteristics of the user, for example personal information, such as an address, a mail address, a name, a home address, a work address, a telephone number, a height, a weight, and an age.

It should be noted that the set of human dependent variables may be generated according to any combination of the aforementioned embodiments. For example, the human dependent variables may be generated according to personal information of the user, recorded mouse trajectories, and an image of the user's face.

Now, as shown at 90, the digital content of the data segment is rearranged according to the human dependent variables. In such a manner, a unique rearranged data segment is created according to the human dependent variables. The data segment is rearranged according to human dependent variables, which are created by purely random inputs of a human user and not according to a pseudo random generator, such as a 12 bit linear feedback shift register (LFSR) that generates a sequence of numbers that approximates the properties of random numbers.

In some embodiments of the present invention, a set of human dependent variables is generated according to human related activities which are recorded in advance and accessed when the rearrangement is performed. For example, the computing unit may routinely record the activities of its operators and update the set of human dependent variables accordingly. In another embodiment, human related activities are hosted on a central computing unit, such as central server, which may be accessed by one or more computing units. Each one of the computing unit may access the human related activities which are stored on the central computing unit and use them for rearranging a data segment. In such an embodiment human related activities may be recorded and/or hosted by a single computing unit while a plurality of computing units may be able to make a use out of it.

As shown at 93, the rearrangement is logged for allowing the retrieval of the digital content that is stored in the rearranged data log. A detailed description of the rearrangement process is provided below, with respect to FIG. 4.

Optionally, the rearranged data segment is stored, optionally locally, on the memory of the computing unit that has been used for rearranging it. The digital content that is stored in the rearranged data segment may be retrieved, as shown at 92, using the data log, optionally as described below. As the rearrangement is logged, digital content that is contained in a certain data segment may be retrieved even if the rearrangement process 90 has been cancelled or stopped before its completion. The logging documents all the manipulations which have been performed on the data segment and therefore the digital content may by retrieved by backtracking the logged rearrangement.

For clarity, it should be noted that the data segment, the rearranged data segment, and/or any sub segment thereof may be represented in any dimension, for example 1, 2, 3, 5, 10, 50, 100, 1000, and N dimensions.

Figure 2:
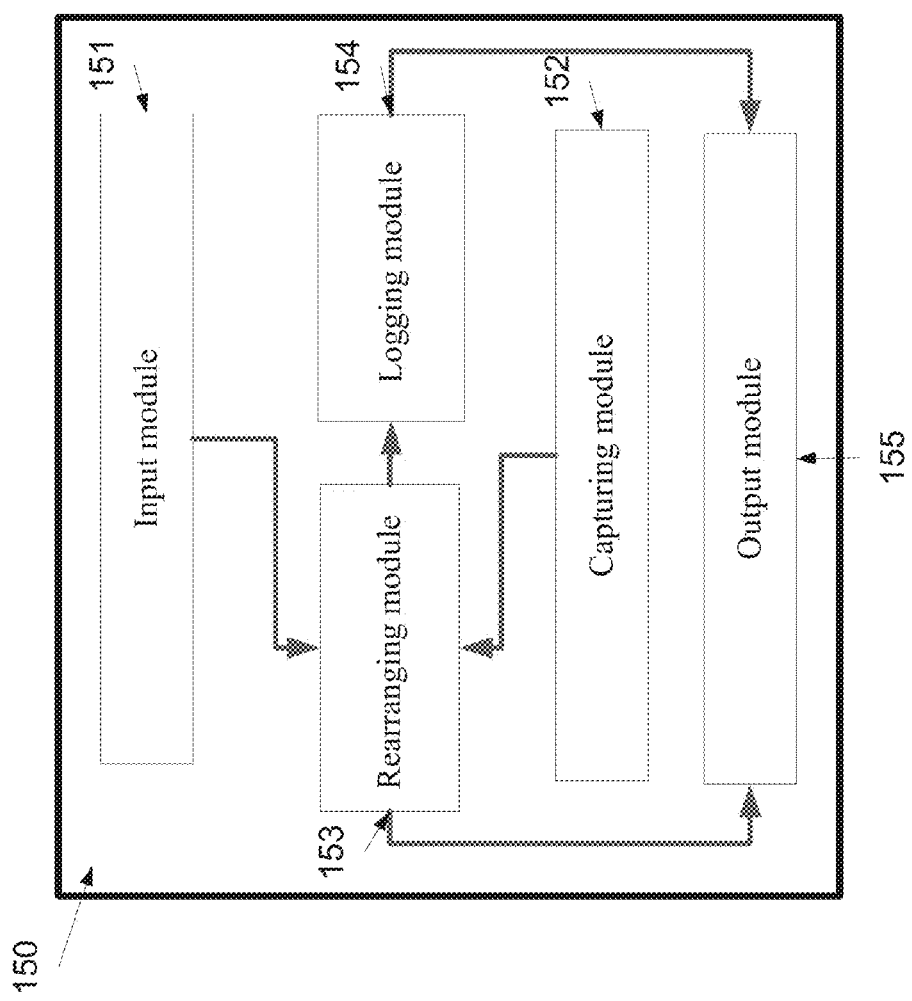
FIG. 2 is a schematic illustration of a system for rearranging digital content of a data segment according to human related activities, according to some embodiments of the present invention.

Reference is now made to FIG. 2, which is a schematic illustration of a system 150 for rearranging digital content of a data segment according to human related activities, according to some embodiments of the present invention. The system may be implemented on one or more computing units, such as servers, personal computers, Smartphones and the like. Such a system includes an input module 151 for receiving a data segment containing digital content and a capturing module 152 for recording a plurality of human related activities and generating a set of human dependent variables accordingly. Optionally, the input module 151 is associated with a GUI that is displayed on a, such as the screen of the computing unit. The GUI allows a user to select the digital content that is rearranged as described below. Optionally, the GUI may be used for selecting one or more files and/or folders.

The capturing module 152 records user activities, such as mouse manipulations and keyboard typing from the electronics on the computing unit. Optionally, the capturing module 152 is based on a software component and/or hardware component, such as a mini peripheral component interconnect (PCI) and/or an external USB component that is installed in the computing unit. Optionally, the recording of the capturing module 152 is imperceptible to the operating system and/or any other application that is executed on the computing unit.

The system 150 further comprises a rearranging module 153 for rearranging a data segment that stores the digital content according to the set of human dependent variables and a logging module 154 for logging the rearranging. As further described below, the data log allows the retrieving of the digital content from the rearranged data segment. The system further comprises an output module 155 that allows the outputting of the data log and the rearranged data segment.

Figure 4:
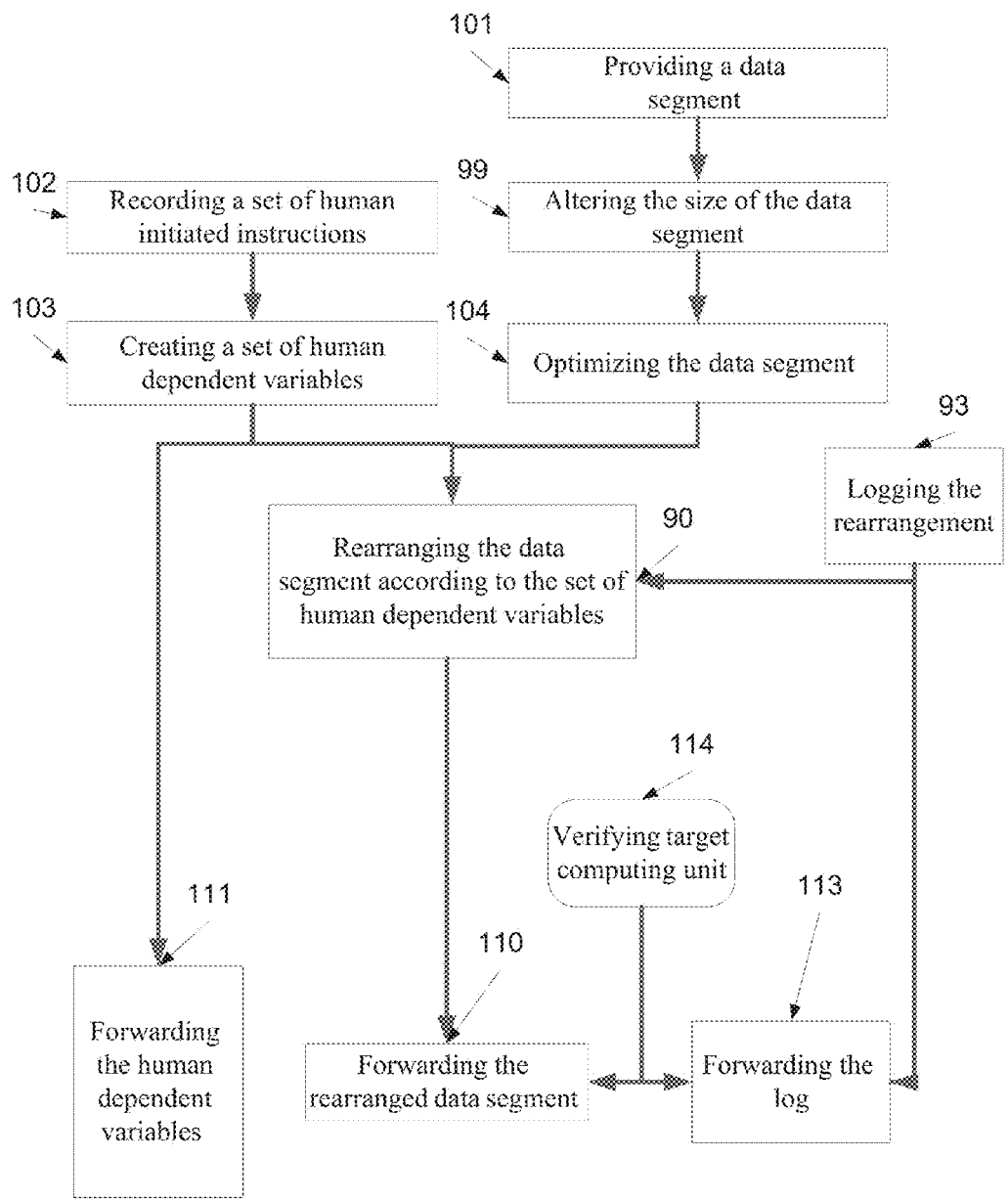
FIG. 4 is a flowchart of a method for forwarding a data segment in a manner that allows a receiving side to verify the authenticity thereof, according to some embodiments of the present invention.

Reference is now made to FIG. 4, which is a flowchart of a method for rearranging a data segment, according to some embodiments of the present invention. Blocks 101, 102, 103, and 90 are as depicted in FIG. 1, however FIG. 4 further depicts optional rearranging processes, as depicted in block 90, and additional blocks that depict optional process and optional actions which may be performed.

Optionally, after the data segment has been provided, as shown at 101, the size of the data segment is changed 99, for example by adding unrelated content thereto. In some embodiment of the present invention, the unrelated content is collected, optionally randomly, from the memory of a designated repository, optionally of the computing unit that is used for executing the method 100. The collection may be performed during the executing of the rearranging method 100 or as a preparation to the execution thereof. The unrelated content is optionally added as one or more sub-segments before the rearranging of 90. These sub-segments may be as any other sub-segment of the data segment, as further described below. These data sub-segments may be added before, after, and/or in between other sub-segments of the data segment. The addition of the content is optionally logged in the data log in a manner that allows the identification thereof during the retrieval. In such an embodiment, the size and the content of the data segment are not equal to the size and the content of the original digital content which has been hosted therein. It should be noted that by adding the unrelated content, the size and the data of the data segment are changed in a manner that cyclic redundancy check (CRC) or any other scheme or a check that is based on information and/or calculation related to the digital content that is stored in the data segment cannot be used for detecting errors. Such a scheme or a check may be performed only after the data segment is retrieved from the rearranged data segment.

In some embodiment of the present invention, the unrelated content is used for manipulating the distribution of space characters and/or free space characters in a data segment that includes texts. As commonly known, space characters may indicate to certain applications where a certain line begins or ends are removed.

Optionally, after the data segment has been provided, as shown at 101, the data segment, which can be read as a binary array of one or more dimensions, is optimized, as shown at 104. During the optimization process the size of the data segment is reduced, optionally using a known compression algorithm such as Zlib or Lempel-Ziv-Welch (LZW) algorithm. In such an embodiment, the data segment has to be decompressed in order to retrieve the digital content that is stored therein.

After the set of human dependent variables has been generated, as depicted at 103, and after the data segment has been provided and optionally optimized, as shown at 103 and 104, the content of the data segment may be rearranged according to one or more of the blocks which are depicted in 106-108 and may be referred to herein as a rearranging process, optionally as described below. As shown at 112, the rearranging process is recorded, optionally in the data rearranging log. In some embodiments of the present invention, each rearrangement procedure is documented in the data rearranging log, for example using a tag that may be identified by the target computing unit.

Figure 5:
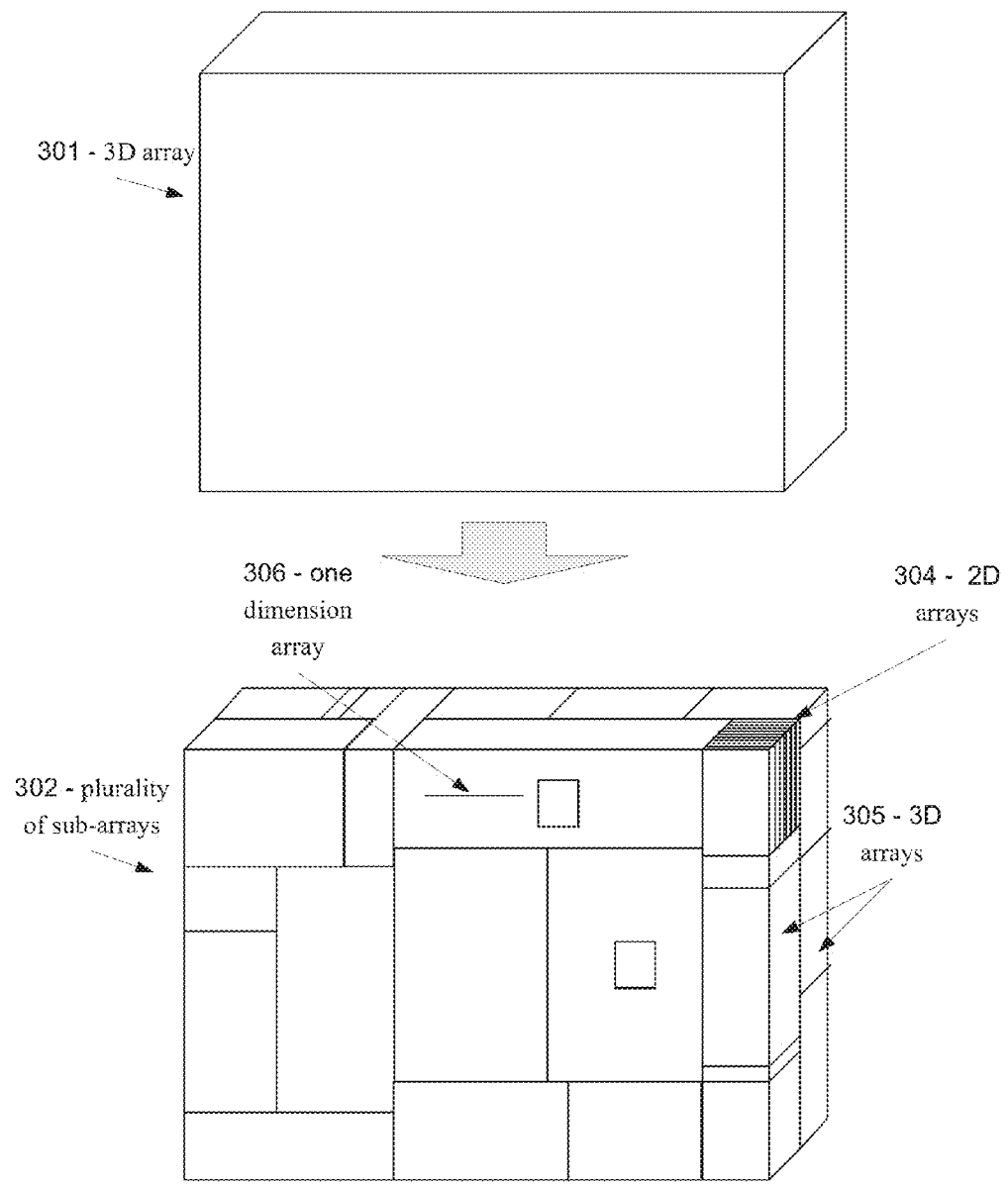
FIG. 5 depicts a schematic illustration of a data segment that is represented as an exemplary three dimensional (3D) array that is divided to a plurality of sub-arrays with different sizes and/or dimensions, according to some embodiments of the present invention.

As shown at 105, the data segment is divided to a number of arrays. The size of each array and/or the number of its dimensions may or may not differ. For example, FIG. 5 depicts a schematic illustration of a data segment that is optionally represented as an exemplary three dimensional (3D) array 301 that is divided to a plurality of sub-arrays 302 with different sizes and/or dimensions. The plurality of sub-arrays 302 includes two dimensional arrays 304, three dimensional arrays, as shown at 305, and one dimensional array 306. It should be noted that the plurality of sub-arrays 302 may include an array of any dimension which may referred to herein as N-dimension. Optionally, the sub-arrays 302 are created according to the set of human dependent variables.

In such an embodiment, the data log is updated with information that reflects the division and the set of human dependent variables that has been used for performing it. The plurality of sub-arrays 302 includes two dimensional arrays 304, three dimensional arrays, as shown at 305, and/or one dimensional array 306. It should be noted that the plurality of sub-arrays 302 may include an array which is arranged in number of dimensions. Optionally, the sub-arrays 302 are created according to the set of human dependent variables. Optionally, the data rearranging log documents the arrangement which is performed on 105.

Figure 6:
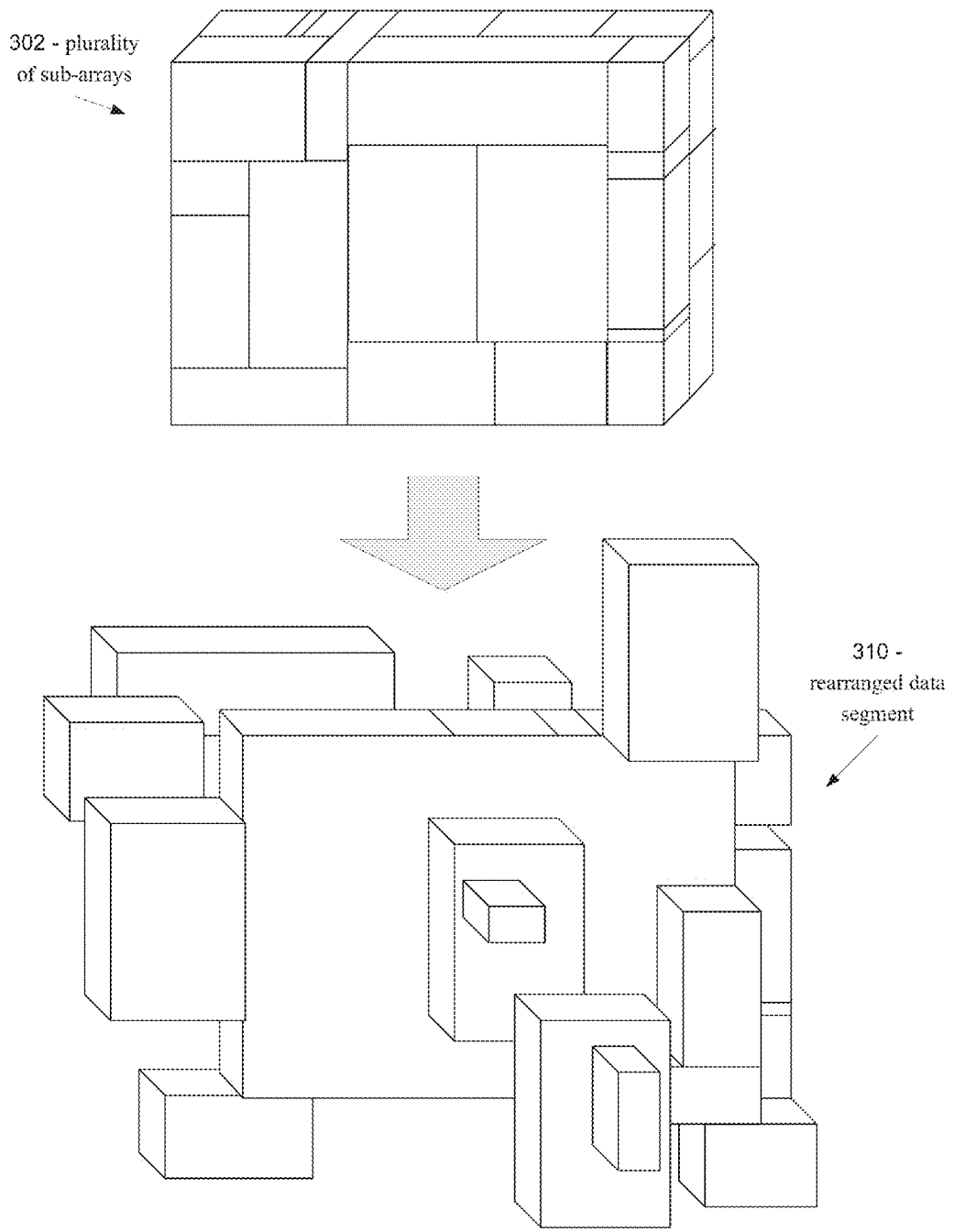
FIG. 6 depicts a schematic illustration of the exemplary sub-arrays of FIG. 5 which is rearranged according to the aforementioned set of human dependent variables to create a rearranged data segment, according to some embodiments of the present invention.

Now, as shown at 106, the arrays are rearranged, optionally according to the set of human dependent variables. For example, FIG. 6 depicts a schematic illustration of the exemplary sub-arrays 302 of FIG. 5 which is rearranged according to the aforementioned set of human dependent variables to create a rearranged data segment, as shown at 310. In such an embodiment, the data log is updated with information that reflects the rearrangement and the set of human dependent variables that has been used for performing it. Optionally, the data rearranging log documents the arrangement that is performed on 106.

In addition, as shown at 107, the data that is stored in each one of the sub arrays may be rearranged according to the aforementioned set of human dependent variables.

Figure 8:
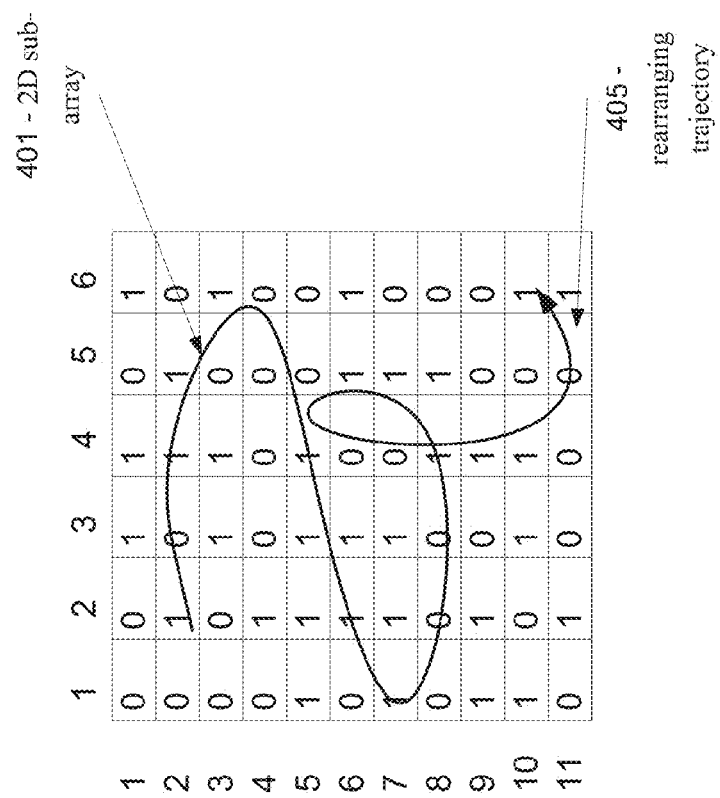
FIG. 8 is a schematic illustration of a personal computer which is used for generating a set of human dependent variables according to the rearranging trajectory which is used in FIG. 7.
Figure 7:
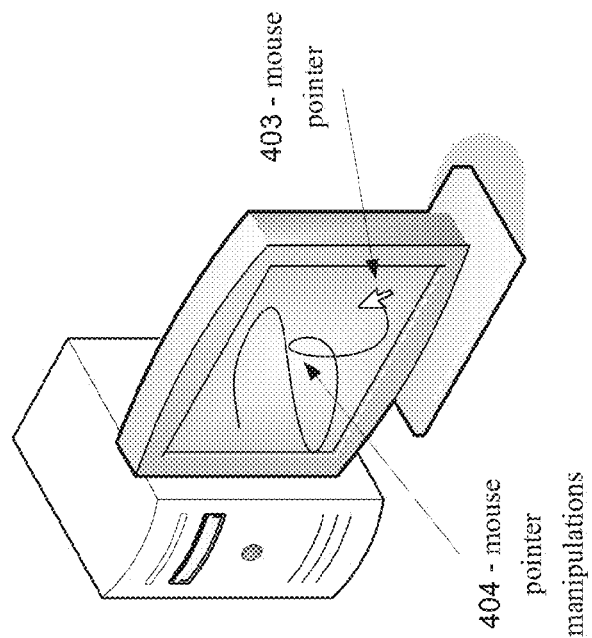
FIG. 7 is a schematic illustration of data that is contained in an exemplary 2D sub-array and a rearranging trajectory, according to some embodiment of the present invention.

Reference is now made to FIG. 7, which is a schematic illustration of data 401 that is contained in an exemplary 2D sub-array, optionally of the exemplary sub-arrays 302 which are depicted in FIG. 6, and a rearranging trajectory 405, according to some embodiment of the present invention. Reference is also made to FIG. 8, which is a schematic illustration of a personal computer 401 that is used for generating a set of human dependent variables according to which the rearranging trajectory 405 is formed. As described above, the data in each sub-array, such as shown at FIG. 7, is rearranged according to a set of human dependent variables. Optionally, the set of human dependent variables is determined according to the manipulations of a mouse pointer 403 of the personal computer 401, optionally as shown at 404. The manipulations may be recorded directly from the port to which is mouse is connected, from the random access memory (RAM) of the personal computer 401, and/or according to the manipulation of the mouse pointer on the screen of the personal computer 401. As described above, the manipulations may be taken from any input device or UI. The set of human dependent variables creates a rearranging trajectory 405 which is used for rearranging the bits of the data 401 that is contained in an exemplary 2D sub-array that is depicted in FIG. 7. As depicted, the rearranging trajectory 405 is determined according to the motion of the mouse pointer on the screen 403. Optionally, bits are switched along the track 105 in the direction according to which it has been drawn. For example, the bit at X(2,2) is replaced with the bit at X(3,2) and the bit at X(3,2) is switched with the bit at X(4,2) and so one and so forth. Optionally, bits are pushed along the rearranging trajectory 405 in the direction according to which it has been drawn. In such an embodiment, the last bit is either switched with one of its neighbors and/or induces a sequence of bit replacements. Optionally, an anti loop procedure is implemented in order to avoid redundant computational actions. In such an embodiment, the data log is updated with information that reflects the data manipulation and the set of human dependent variables that has been used for performing it. Optionally, the data rearranging log documents the arrangement which is performed on 107.

Optionally, the data log is divided to subsets. Each subset may be used for rearranging and/or manipulating a different array. Optionally, the data rearranging log documents the subsets in a manner that allows the retrieving of the rearranged arrays.

Optionally, as shown at 108, the content of the data segment, which the arrays thereof have been rearranged and/or manipulated according to the set of human dependent variables, as described above, is now manipulated according to the set of human dependent variables. Optionally, the data rearranging log documents the rearrangement that is performed on 108.

Optionally, the set of human dependent variables is divided to subsets. Each subset may be used for a different rearranging process. For example, one subset may be used for block 105, another for block 106, another for block 107, and another for block 108. Optionally, the data rearranging log documents the subsets in a manner that allows the retrieving of the rearranged data.

Optionally, as shown at 109, active processes which are run by the source computing unit are halt and/or having their priority reduced during 104, 105, and/or 106. In such a manner, the active processes do not interrupt and/or effect the rearrangement and/or the manipulation of the segment of data. Optionally, the active processes are recorded in a designated log, suspended during 104-108, and then reactivated using the designated log.

For clarity, it should be noted that blocks 105-108 may be implemented on a source computing unit that is connected or disconnected to a communication network, such as the Internet and that the method that is described in FIG. 4 may be implemented online and/or offline.

Figure 9:
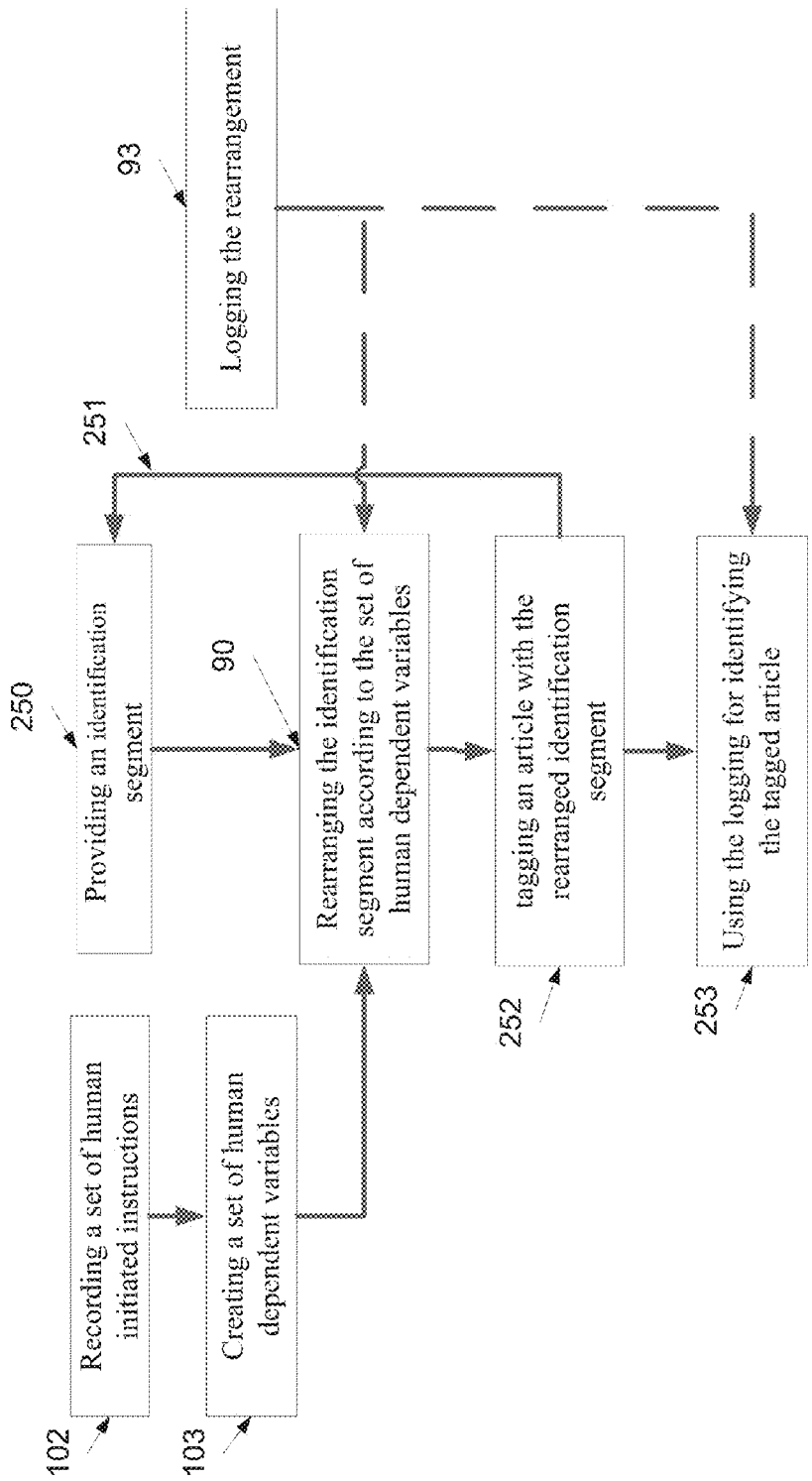
FIG. 9 is a schematic illustration of a method for generating unique identification tags, according to some embodiments of the present invention.

Reference is now made to FIG. 9, which is a schematic illustration of a method for generating unique identification tags, according to some embodiments of the present invention. Blocks 102, 103, and 93 are as described in FIG. 1. However, blocks 250-251 are related to the generation of unique machine-readable representation of information and in block 90 the data segment is a unique identification segment.

Figure 3:
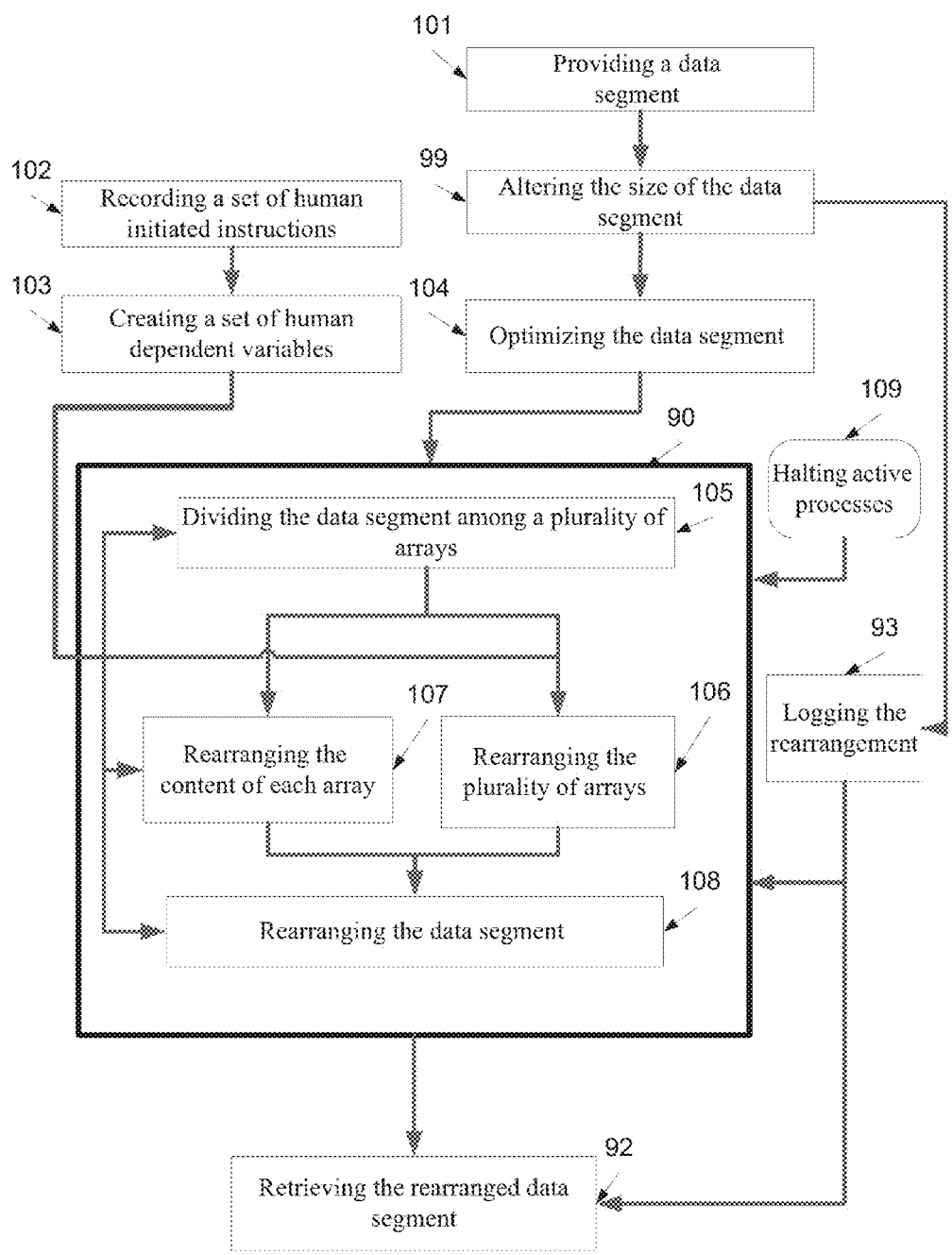
FIG. 3 is a flowchart of a method for rearranging digital content of a data segment according to some embodiments of the present invention.

In some embodiments of the present invention, the system and the method which are described in FIGS. 1, 2 and 3 are used for generating unique identification tags, such as barcodes, radio frequency identification (RFID) tags, and/or any other machine-readable representation of information that is designed to uniquely tag an article, such as a product and/or a document.

First, as shown at 250, a unique identification segment is received. Optionally, the unique identification segment is designed to uniquely represent a product, such as a drug, a lottery ticket, a distributor, an importer, identification information that is related to a certain user, and/or any other product that has to be uniquely identified. As shown at 90, the unique identification segment is rearranged according to the set of human dependent variables, optionally as described above. The rearrangement is logged, as depicted in 93 and described above, and the article that is associated with the unique identification segment is tagged with the rearranged version of the unique identification segment, as shown at 252. The tagging of articles may be repeated for various unique identification segments. In such a manner, the same data log may be used for retrieving the unique identification segments from the rearranged versions thereof, which may be referred to herein as rearranged tags. Such an embodiment allows the tagging of articles with rearranged tags which are presented as unique machine-readable representation of information, such as barcodes and/or RFID tags.

Computing unit which are designed to read the rearranged tags are optionally adjusted to retrieve the rearranged tags using the data log that has been used for creating them. In such an embodiment, identification segments have to be rearranged using the data log, for example as described with relation to referral 90, in order to be retrieved by a certain computing unit that retrieves identification segments by using the data log. In addition, only computing units that have access to the data log may generate rearranged tags which are read by the certain computing unit. Briefly stated, identification segments cannot be rearranged in a manner that allows the retrieving thereof without having access to the data log. In such a manner, the data log may be used for verifying that a certain rearranged tag has been created by an entity that has access to a version of the data log.

Optionally, each unique identification segment is uniquely associated with a product that is distributed by a certain distributor. Such an association allows a manufacturer to monitor the origin of products which are sold in the market. The manufacturer may identify the origin of products by verifying whether the origin of a certain product is a local distributor or another distributor. In such a manner, the manufacturer may detect the distributor that provided products to an unauthorized dealer.

In some embodiments of the present invention, the rearranged tags may be used as authenticating tags or a certain product or a document, such as a bill. For example, the rearranged tags may be generated from identification segments that include identification information that matches the manufacturing date, the expiration date, and/or other information that is related to the product. By retrieving the identification segment of the authenticating tag, a vendor and/or a buyer may verify that a certain product is original.

In some embodiments of the present invention, each rearranged tag is attached a unit of a series of a certain product, for example to a package that includes capsules of a certain drug. Such a rearranged tag may be used as an authentication tag that allows the vendor and/or the client to authenticate the tagged unit. In such an embodiment, each rearranged tag is based on a unique identification segment, such as a unique serial number that is part of a series of unique identification numbers that is managed by a central server. Optionally, every unique serial number may be authenticated only once. In such a manner, a user or a vendor can verify that the tag that is attached to their unit is original and not a copy of a tag that has already been authenticated by another vendor or user. In such a manner, the method, which is depicted in FIG. 9, may be used for tagging packs of drugs and/or any other product in a manner that allows the purchaser to verify their authenticity.

It should be noted that though the rearrangement process that is described in 105-108 is performed using a set of human dependent variables, any random and/or pseudo random generator, such as a 12 bit linear feedback shift register (LFSR), white noise generator, and radio active isotope noise generator, may be used for creating a set of random and/or pseudo random variables. This set may be used, instead and/or together with the aforementioned set of human dependent variables, for rearranging the data segment similarly to the described above.

In some embodiments of the present invention, the methods and the system which are described in FIGS. 1-3 are used for removing information from documents and/or other medium, such as files. Optionally, the system and/or the methods may be used for cleaning segments of the memory of a certain computing unit and the data log that logs the rearrangement thereof is used for retrieving the cleaned information in a case that the cleaning action is canceled and/or erroneously performed.

In some embodiments of the present invention, the methods and/or the system which are described in FIGS. 1-3 are used for cleaning areas in the memory of a certain computing and/or storage unit after a segment that includes information, such as one or more file have been relocated and/or deleted by the user and/or an application. In such a manner, the methods and/or the system are used for improving memory allocation and/or management. The data log that logs the rearrangement thereof is used for retrieving the cleaned information in a case that the cleaning action is canceled and/or erroneously performed.

Reference is now made to FIG. 4, which is a flowchart of a method for forwarding a data segment in a manner that allows a receiving side to verify the authenticity thereof, according to some embodiments of the present invention. Blocks 101, 102, 103, and 90 are as depicted in FIG. 1, however FIG. 4 further depicts additional blocks that depict optional process which are related to data forwarding.

After the data segment has been rearranged, as shown at 110, the rearranged data segment is forwarded to a target computing unit. As shown at 111-113, the target computing unit further receives the data rearranging log and the set of human dependent variables. The rearranged data segment may be forwarded together and/or apart from the data rearranging log and/or the set of human dependent variables. Optionally, the rearranging log and/or the set of human dependent variables are compressed before the forwarding process, for example using a known compression algorithm such as Zlib or LZW algorithm.

The target computing unit may now retrieve the content that has been documented in the rearranged data segment before it has been rearranged by rearrangement process that is shown at 90 and described above. The retrieval is optionally performed by backtracking the changes which are logged in the data rearranging log. Optionally, the backtracking is performed using the human dependent variables. The backtracking is performed by executing the rearrangement procedures which are documented in the data rearranging log in an order that is reverse to their order of appearance in the data rearranging log. Such retrieval may allow an operator of a network to verify the authenticity of the data that is transferred between different computing unitcomputing unit. The data segment is rearranged before the forwarding and retrieved using the data rearranging log that documents the rearranging of the data segment. Any error in the transmission of the data rearranging log and/or the data segment may have an effect on the outcome of the retrieval. Such an effect may distort some and/or all the content that is stored in the data segment.

Optionally, the forwarding is performed over a peer-to-peer (P2P) connection, such as the Point-to-Point Tunneling Protocol (PPTP), Layer 2 Tunneling Protocol (L2TP), peer-to-network (P2N) and/or IPSec (RFC 2637), which the specifications thereof are incorporated herein by reference. In such an embodiment, the source computing unit establishes a P2P connection with a target computing unit, optionally after its identity is verified, as shown at 114. Optionally, the target computing unit is verified according to its internet protocol (IP) address and/or media access control (MAC) address. Optionally, the target computing unit is verified according to its hardware ID, for example as described in USB Human Interface Devices, Revision 1.11, which is incorporated herein by reference.

Optionally, after the P2P connection is established, the source computing unit and/or the target computing unit halt all the other network connections and/or discard the packets which are related thereto. For example, in a computing unit that is operated with Windows™ and/or Unix™ operating system, the command NETSTAT may be used for identifying the network connections and the command KILL for stopping them. Optionally, the halted network connections are logged before they are halt and revived after the P2P connection is disconnected.

In some embodiments of the present invention, the rearranged data segment is divided to a plurality of rearranged data sub-segments. The sub-segments may be spread among a number of computing unitcomputing unit or storage computing unit. Optionally, none of the computing unitcomputing unit hosts all the rearranged data sub-segments. As all the rearranged data sub-segments are required in order to retrieve the rearranged data, a computing unit that wants to retrieve the rearranged data has to gather them. The ability to accurately retrieve the rearranged data indicates, inter alia, that the retrieving computing unit has received all the rearranged data sub-segments in a proper state.

In some embodiments of the present invention, the data log is divided, equally or nonuniformly to a plurality of data log subsets and/or created as a plurality of data log subsets. Optionally, none of the computing unitcomputing unit that share a common data log hosts all the data log subsets. Optionally, the data segment is rearranged according to a data log. In such an embodiment, each one of the plurality of data log subsets has to be collected in order to retrieve the rearranged data segment. It should be noted that dividing the data log among a plurality of computing units becomes possible since the actions which are recorded in the data log, which may function as a key for retrieving the rearranged data segment, are not related to and/or effected by one another. The ability to accurately retrieve the rearranged data segment indicates, inter alia, that the retrieving computing unit received all the data log subsets in a proper state.

Such an embodiment may be used for creating a data log that in divided among a number of computing unit and may be referred to herein as a shared data log. Such a shared data log may be divided among a plurality of computing units or entities in a manner that assures that only if a communication among all the computing unit is established, the digital data in the data segment is retrieved. For example, the data content may be retrieved only when all the computing unit can share their data log subsets.

Figure 10:
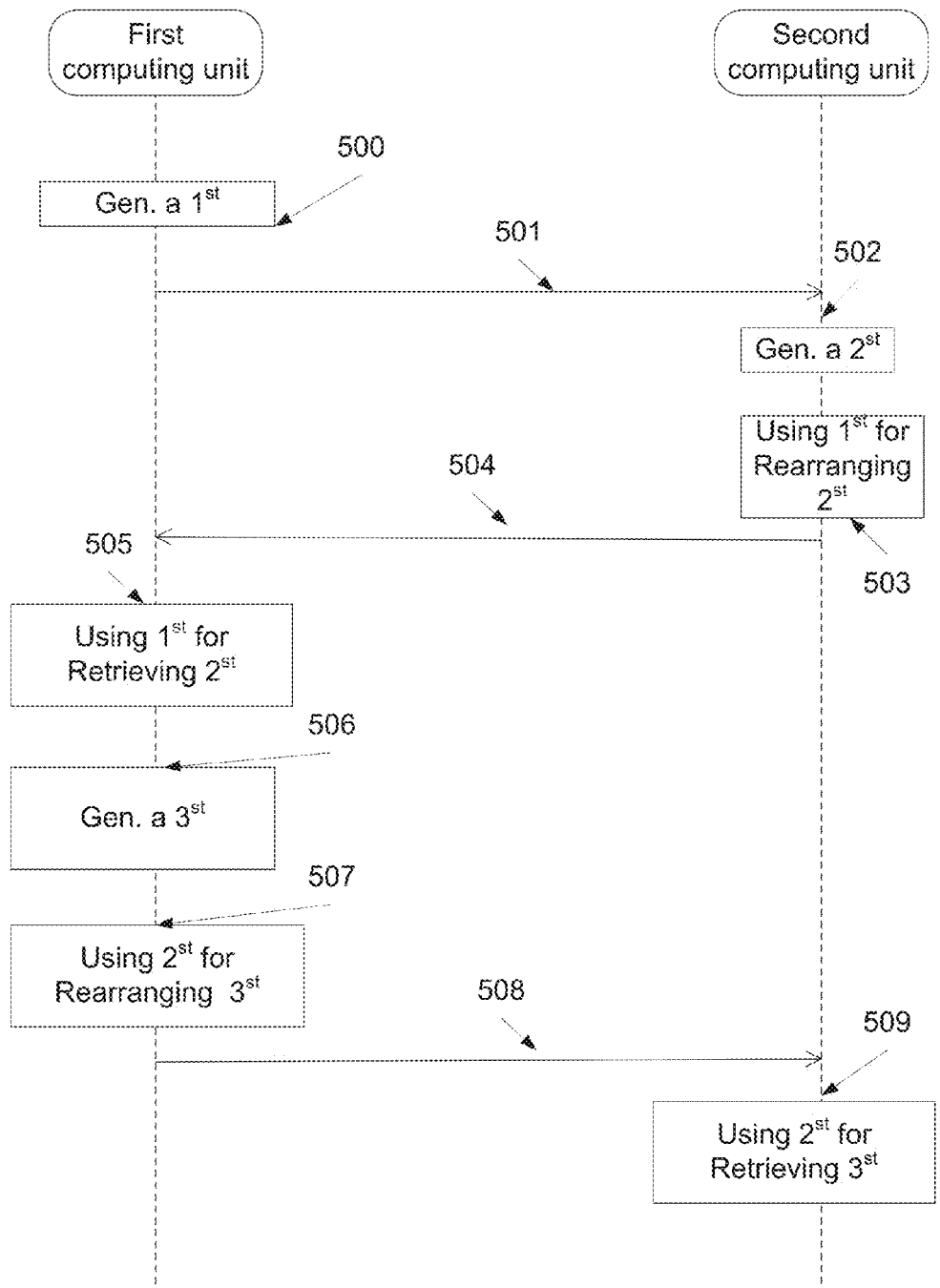
FIG. 10 is a sequence diagram of a process for creating a set of human dependent variables by combining human related activities which are recorded in two computing unitcomputing unit, according to some embodiments of the present invention.

Reference is now also made to FIG. 10, which is a sequence diagram of a process for creating a shared data log by combining data logs which are generated in two computing unitcomputing unit, according to some embodiments of the present invention. First, as shown at 500, a first computing unit is used for generating a first data log and forwards it, as shown at 501, optionally via a network, to a second computing unit. Now, as shown at 502, the second computing unit generates a second data log, optionally as described above in relation to numeral 103 of FIG. 4. Then, as shown at 503, the second computing unit uses the first data log for rearranging the second data log. The rearranging is optionally performed by following the actions which are documented in the data log. Next, as shown at 504, the second computing unit forwards the rearranged version of the second data log to the first computing unit. As shown at 505, the first computing unit uses the first data log to retrieve the second data log from the rearranged version it receives, optionally as described above. As shown at 506, the first computing unit now generates a third data log, optionally as described above in relation to numeral 103 of FIG. 4. Then, as shown at 507, the first computing unit uses the second data log for rearranging the third data log. Next, as shown at 508, the first computing unit forwards the rearranged version of the third data log to the second computing unit. As shown at 509, the second computing unit uses the second data log to retrieve the third data log from the rearranged version it receives, optionally as described above. Now, both the first and the second computing unitcomputing unit have copies of the first and the second data logs and can use the combination thereof to rearrange content and to forward it, optionally as described above in relation to FIG. 4.

The process which is depicted in FIG. 10 may be repeated in any number of pairs of computing unitcomputing unit. For example, first and second network pairs may synchronize a data log as depicted in FIG. 10. Then, the second computing unit may synchronize its data log with a data log of a third computing unit and update the first computing unit about the synchronization.

The method that is described in FIG. 10 allows first and the second computing unitcomputing unit to generate a shared data log which has not been affected by any other computing unitcomputing unit. In such a manner, the content is rearranged according to data logs that have not been exposed to any computing unit except of the first and the second computing unitcomputing unit. The method may be used for updating a data log that is shared among a plurality of computing units. In such an embodiment, the process which is described in FIG. 10 is used for updating a data log which is shared among a plurality of computing units.

It is expected that during the life of a patent maturing from this application many relevant systems and methods will be developed and the scope of the terms forwarding, a network, and a computing unit are intended to include all such new technologies a priori.

As used herein the term "about" refers to ±10%

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for rearranging a data segment using a processor, comprising:
   providing a data segment of a file containing digital content;
   routinely recording a human routine operation performed by a user to activate a function on a computing unit, the recording performed as a background task on an automated schedule;
   generating a set of human dependent variables according to said recording;
   creating a rearranging path for the data segment according to said set of human dependent variables, the rearranging path indicating a sequential order of bits to be replaced to be used for rearrangement;
   rearranging said data segment in said file according to the rearranging path, using the processor;
   updating a log according to said rearranging to document said rearranging that have been performed on the data segment; and
   storing said log and said rearranged data segment separately from one another;
   wherein said digital content is retrieved from said rearranged data segment according to said log;
   wherein said function is independent from said rearranging.

2. The computerized method of claim 1, further comprising adding unrelated content to said data segment before said rearranging.

3. The computerized method of claim 1, wherein said generating is performed by a computing unit, said generating comprising recording said plurality of human related activates from a routine operation of said computing unit by a human user.

4. The computerized method of claim 3, wherein said routine operation is an input recorded from a group consisting of manipulating of a mouse pointer and typing a sequence of letters.

5. The computerized method of claim 3, wherein said recording comprises recording an audio print of the voice of said user, said human dependent variables comprises features extracted from said audio print.

6. The computerized method of claim 3, wherein said recording comprises recording a fingerprint of the voice of said user, said human dependent variables comprises features extracted from said fingerprint.

7. The computerized method of claim 3, wherein said recording comprises analyzing information related to a profile of said user, said human dependent variables comprises features extracted from said analysis.

8. The computerized method of claim 3, wherein said generating is performed by a computing unit, said recording comprises capturing at least one biometric characteristic related to a user operating said computing unit.

9. The computerized method of claim 8, wherein said at least one biometric characteristic comprises features extracted from an image of said user.

10. The computerized method of claim 1, further comprising compressing said data segment before said rearranging.

11. The computerized method of claim 1, wherein said rearranging comprises dividing said data segment to a plurality of arrays and rearranging said plurality of arrays according to said rearranging path.

12. The computerized method of claim 11, wherein said plurality of arrays comprises at least one of a subgroup of arrays each having a different size and a subgroup of arrays each having a different number of dimensions.

13. The computerized method of claim 11, wherein said dividing is performed according to said human dependent variables.

14. The computerized method of claim 11, wherein the digital content which is stored in at least one of said plurality of arrays is rearranged according to said rearranging path.

15. The computerized method of claim 11, wherein said rearranging comprises further rearranging said divided rearranged data segment according to said rearranging path.

16. The computerized method of claim 11, wherein said rearranging comprises dividing said set of human dependent variables to a plurality of subsets and using each said subset for rearranging at least one of said plurality of arrays.

17. The computerized method of claim 1, wherein said method is executed using a computing unit, said rearranging comprising halting a plurality of processes executed on said computing unit during said rearranging.

18. The computerized method of claim 1, further comprising dividing said data segment to a plurality of data sub-segments and spreading said plurality of data sub-segments among a plurality of computing units;
   wherein said digital content is retrieved after said plurality of data sub-segments are gathered.

19. The computerized method of claim 1, further comprising dividing said log to a plurality of subsets and spreading said plurality of subsets among a plurality of computing units; wherein said digital content is retrieved after said plurality of subsets being gathered to reconstruct said log.

20. The computerized method of claim 1, wherein said digital content comprises identification information related to an article, further comprising using said rearranged data log for tagging for said article.

21. The computerized method of claim 20, wherein said tagging allows the authentication of said article.

22. The computerized method of claim 1, wherein said data segment is hosted in a memory device, said method being performed in response to a deletion of information stored in said data segment.

23. The computerized method of claim 1, wherein said digital content is retrieved from said rearranged data segment according to said log, even upon premature stopping of the rearranging.

24. The computerized method of claim 1, wherein the rearranging occurs on arrays of at least three different sizes.

25. A method for forwarding a data segment, comprising:
   providing a data segment of a file containing digital content at a source computing unit;
   routinely recording a human routine operation performed by a user to activate a function on a computing unit, the recording performed as a background task on an automated schedule;
   generating a set of human dependent variables according said recording;
   creating a rearranging path for the data segment according to said set of human dependent variables, the rearranging path indicating a sequential order of bits to be replaced to be used for rearrangement;
   rearranging said data segment in said file according to the rearranging path;
   logging said rearranging in a rearranging log to document said rearranging that have been performed on the data segment;
   storing said log and said rearranged data segment separately from one another; and
   separately forwarding said rearranged data segment and said log to a target computing unit;
   wherein said function is independent from said rearranging.

26. The method of claim 25, wherein said target computing unit may retrieve said digital content from said rearranged data segment by using said set of human dependent variables according to said rearranging log.

27. The method of claim 25, further comprising verifying said target computing unit before said forwarding.

28. The method of claim 27, wherein said verifying is based on at least one of the internet protocol (IP) address, the media access control (MAC), and the hardware identification of said target computing unit.

29. The method of claim 25, wherein said forwarding comprises halting a communication of at least one of said source and target computing unit.

30. The method of claim 25, wherein said forwarding comprises separately forwarding said rearranged data segment to said rearranging log target computing unit.

31. The method of claim 25, wherein said forwarding is performed over a peer-to-peer (P2P) connection.

32. The method of claim 25, wherein said generating comprises:
   a) generating a first segment of said human dependent variables in said source computing unit;
   b) generating a second segment of said human dependent variables in said target computing unit; and
   c) combining said first and second segments for generating said set of human dependent variables.

33. The computerized method of claim 32, further comprising:
   forwarding said first segment to said target computing unit before said b);
   allowing said target computing unit to use said first segment for rearranging said second segment and forwarding said rearranged second segment to said source network before said c); and
   allowing said source computing unit to use said first segment for retrieving said second segment from said rearranged second segment before said c);
   wherein said combining is separately performed in each said computing unit.

34. A system for rearranging a data segment, comprising:
   a processor;
   an input module configured for receiving a data segment containing digital content;
   a capturing module which routinely records a human routine operation performed by a user to activate a function on a computing unit and generating a set of human dependent variables accordingly, the recording performed as a background task on an automated schedule;
   a rearranging module which uses said processor to rearrange said data segment according to a rearranging path; and
   a logging module which generates a log documenting said rearranging to document said rearranging that have been performed on the data segment, creates a rearranging path for the data segment according to said set of human dependent variables, the rearranging path indicating a sequential order of bits to be replaced to be used for rearrangement, and stores said log separately from said rearranged data segment, said log allows retrieving of said digital content from said rearranged data segment;
   wherein said function is independent from said rearranging.

35. A computerized method for generating a unique identification tag to an article using a processor, said method comprising:
   providing an identification segment containing identification information;
   routinely recording a human routine operation performed by a user to activate a function on a computing unit, the recording performed as a background task on an automated schedule;
   generating a set of random variables according to said recording;
   creating a rearranging path for a data segment according to a set of human dependent variables, the rearranging path indicating a sequential order of bits to be replaced to be used for rearrangement;
   rearranging, using the processor, said identification segment according to the rearranging path;
   updating a log according to said rearranging to document said rearranging that have been performed on the data segment;

storing said log and said identification segment separately from one another; and tagging an article with said rearranged identification segment;

wherein said identification segment is retrieved using said log;

wherein said function is independent from said rearranging.

36. The computerized method of claim 35, wherein said random variables are human dependent variables generated according to a plurality of human related activities.

37. The computerized method of claim 35, wherein said tagging comprises associating said article with a tag comprising said rearranged identification segment, said tag being selected from a group consisting of: a barcode, a radio frequency identification (RFID) tag, a machine-readable visual representation, and a machine-readable audio representation.

38. The computerized method of claim 35, further comprising allowing an authentication of said article by said retrieved identification segment.

* * * * *